US012699821B2

(12) United States Patent
Wasserkrug et al.

(10) Patent No.: US 12,699,821 B2
(45) Date of Patent: Aug. 4, 2026

(54) LEARNING OPTIMIZATION CONSTRAINTS THROUGH KNOWLEDGE BASED DATA GENERATION

(71) Applicant: International Business Machines Corporation, Armonk, NY (US)

(72) Inventors: Eliezer Segev Wasserkrug, Haifa (IL); Yishai Abraham Feldman, Tel Aviv (IL); Eitan Daniel Farchi, Pardes Hanna-Karkur (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1230 days.

(21) Appl. No.: 17/582,424

(22) Filed: Jan. 24, 2022

(65) Prior Publication Data

US 2023/0237222 A1 Jul. 27, 2023

(51) Int. Cl.
| | |
|---|---|
| *G06N 20/00* | (2019.01) |
| *G06F 30/27* | (2020.01) |
| *G06Q 10/04* | (2023.01) |
| *G06F 111/04* | (2020.01) |
| *G06F 111/10* | (2020.01) |

(52) U.S. Cl.
CPC ............. *G06F 30/27* (2020.01); *G06N 20/00* (2019.01); *G06F 2111/04* (2020.01); *G06F 2111/10* (2020.01)

(58) Field of Classification Search
None
See application file for complete search history.

(56) References Cited

U.S. PATENT DOCUMENTS

| | | | |
|---|---|---|---|
| 7,546,578 | B2 | 6/2009 | Yang |
| 9,606,964 | B1 | 3/2017 | Anjomshoa et al. |
| 2015/0293512 | A1 | 10/2015 | Egge |

OTHER PUBLICATIONS

Maragno, Donato et al "Opticl: mixed-integer optimization with constraint learning.", arXiv:2111.04469v1, 2021 (Year: 2021).*
Iommazzo, Gabriele, et al. "A learning-based mathematical programming formulation for the automatic configuration of optimization solvers." International Conference on Machine Learning, Optimization, and Data Science. Cham: Springer International Publishing, 2020. (Year: 2020).*

(Continued)

*Primary Examiner* — Kamini S Shah
(74) *Attorney, Agent, or Firm* — Jeffrey Kelly

(57) ABSTRACT

In some examples, a system for generating optimization constraints includes a memory device to store human-generated constraint and/or objective definitions that have been programmed in a general-purpose programming language by a human user, and a processor configured to generate labeled data for a plurality of solutions to an optimization problem using the stored constraint and/or objective definitions. The processor is also configured to generate a formal constraint and/or objective model from the labeled constraint and/or objective data, wherein the formal constraint and/or objective model comprises automatically generated constraint and/or objective definitions that are syntactically different from the human-generated constraint and/or objective definitions and syntactically correct for a specific optimization engine.

14 Claims, 3 Drawing Sheets

(56) References Cited

OTHER PUBLICATIONS

Fajemisin, A et al. Optimization with constraint learning: A framework and survey (2021), arXiv:2110.02121v1. (Year: 2021).*

Popescu, A., Polat-Erdeniz, S., Felfernig, A. et al. An overview of machine learning techniques in constraint solving. J Intell Inf Syst 58, 91-118 (2021). https://doi.org/10.1007/s10844-021-00666-5 (Year: 2021).*

Duc, Duy Nguyen, and Narameth Nananukul. "A hybrid methodology based on machine learning for a supply chain optimization problem." Journal of Physics: Conference Series. vol. 1624. No. 5. IOP Publishing, 2020. (Year: 2020).*

Pawlak et al., "Automatic synthesis of constraints from examples using mixed integer linear programming", European Journal of Operational Research, Sep. 16, 2017, pp. 1141-1157, vol. 261, Issue-3.

Raedt et al., "Learning Constraints from Examples", Proceedings of the AAAI Conference on Artificial Intelligence, 2018, pp. 7965-7970, vol. 32, No. 1.

Unknown, "Optaplanner heuristic optimization engine", 2023, 6 Pages, https://www.optaplanner.org.

Unknown, "Optquest metahueristic optimization engine", retrieved on Aug. 20, 2024, 10 Pages, https://www.opttek.com/products/optquest/.

Unknown, "QUACQ", 2015, 2 Pages, https://www.lirmm.fr/constraintacquisition/quacq.html.

Anonymous, "Method and System for Building Mathematical Optimization Model using Interactive Graphical Pipeline", An IP.com Prior Art Database Technical Disclosure; IPCOM000237716D; Jul. 4, 2017, 12 pages.

* cited by examiner

```
def cost_objective (self) :
    return sum (self.assigned_offices (o1, f1) * self.get_office_info (o1) .cost
        for o1 in self.all_office_types ( )
            for f1 in self.all_floors ( ) )
```
302

```
def same_floor (self) :
    return all (self.unique_assignment (e1.number) ==
        self.unique_assignment (e1.team_lead)
            for e1 in self.employees if not
    self.get_employee (e1.team_lead).is_independent )
```
304

FIG. 3A

```
minimize sum (o1 in all_office_types, f1 in all_floors) assigned_offices[o1][f1] *
get_office_info[o1].cost + 20000 * (sum (a1 in all_areas, f1 in all_floors)
area_penalty[a1][f1]);
```
306

```
forall (e1 in employees : get_employee[e1.team_lead].is_independent == 0) forall (x in
set_of_building_floors) floor_assignments[e1.number][x] == floor_assignments[e1.team_lead][x];
```
308

FIG. 3B

LEARNING OPTIMIZATION CONSTRAINTS THROUGH KNOWLEDGE BASED DATA GENERATION

BACKGROUND

The present disclosure relates to techniques for learning a mathematical optimization model that includes optimization objectives and constraints. Mathematical optimization techniques have a wide variety of uses in the business world, from inventory management, task scheduling, supply chain management, vehicle routing, and many others. Specifying the mathematical formulation of an optimization problem typically requires significant time and expertise. One of the most time-consuming and difficult steps in such modeling is translating the problem specific constraints and objectives, which can be quite complex, into a mathematical formulation which can be efficiently solved by an optimization algorithm.

SUMMARY

According to an embodiment described herein, a system for learning all or part of a mathematical optimization model can include a memory device to store human-specified constraint and/or objective definitions that have been programmed in a general-purpose programming language by a human user. The system may include a processor to generate labeled data for a plurality of solutions to an optimization problem using the stored constraint and/or objective definitions. The processor may generate a formal constraint and/or objective model from the labeled data, wherein the formal constraint and/or objective model comprises automatically generated constraint and/or objective definitions that are syntactically different from the human-generated constraint and/or objective definitions and syntactically correct for a specific optimization engine.

In some embodiments, the processor may generate a solution to the optimization problem using the automatically generated constraint and/or objective definitions and execute a computer-readable instruction based on the solution. The processor may be further configured to generate a formal objective model from the labeled data. The formal objective model may comprise an automatically generated objective function that is syntactically different from the human-generated objective function and syntactically correct for a specific optimization engine. In an exemplary embodiment, the generation of the labeled data may comprise selecting values for each one of a plurality of decision variables, inputting the values to an objective function to compute a value of the objective function, and inputting the values to the human-generated constraint definitions to determine, for each solution, whether the values satisfy the corresponding constraints. In exemplary embodiments, selecting values of each one of the plurality of decision variables may comprise selecting the values, via an active learning algorithm, based on the labeled data generated for a previously processed solution or previous learning iterations. The labeled data may comprise, for each solution, real values of each solution decision variable input to an objective function of the optimization problem, and a Boolean value for each solution indicating whether the values of the plurality of decision variables satisfy corresponding human-generated constraint definitions. In some exemplary embodiments, the labeled constraint data may comprise a value of the objective function(s) computed based on the input values of each solution. The automatically generated constraint/objective definitions may be generated by a machine learning algorithm.

An exemplary embodiment may comprise a method of learning all or part of a mathematical optimization model. An exemplary method may comprise receiving human-generated constraint and/or objective definitions that have been programmed in a general-purpose programming language by a human user. The exemplary method may comprise generating labeled data for a plurality of solutions to an optimization problem using the stored constraint and/or objective definitions. The exemplary method may comprise generating a formal constraint and/or objective model from the labeled data, wherein the formal constraint and/or objective model comprises automatically generated constraint and/or objective definitions that are syntactically different from the human-generated constraint and/or objective definitions and syntactically correct for a specific optimization engine.

The exemplary method may comprise generating a solution to the optimization problem using the automatically generated constraint and/or objective definitions and executing a computer-readable instruction based on the solution. The exemplary method may comprise generating a formal objective model from the labeled data. The formal objective model may comprise an automatically generated objective function that is syntactically different from the human-generated objective function and syntactically correct for a specific optimization engine. Generating the labeled data may comprise selecting values for each one of a plurality of decision variables. Generating the labeled data may also comprise inputting the values to an objective function to compute a value of the objective function, and inputting the values to the human-generated constraint definitions to determine, for each solution, whether the values satisfy the corresponding constraints. Selecting values of each one of the plurality of decision variables may comprise selecting the values, via an active learning algorithm, based on the labeled data generated for a previously processed solution or previous learning iterations. The labeled data may comprise, for each solution real values of each solution variable input to an objective function of the optimization problem, and a Boolean value for each solution indicating whether the values of the plurality of decision variables satisfy corresponding human-generated constraint definitions. In an exemplary method, the labeled constraint data may comprise a value of the objective function(s) computed based on the input values of each solution variable. The automatically generated constraint/objective definitions may be generated by a machine learning algorithm.

An exemplary embodiment may comprise a computer program product. The exemplary computer program product may comprise a computer readable storage medium having program instructions embodied therewith, wherein the computer readable storage medium is not a transitory signal per se. The program instructions may be executable by a processor to cause the processor to receive human-generated constraint and/or objective definitions that have been programmed in a general-purpose programming language by a human user. The program instructions may cause the processor to generate labeled data for a plurality of solutions to an optimization problem using the stored constraint and/or objective definitions. Further, the program instructions may cause the processor to generate a formal constraint and/or objective model from the labeled data, wherein the formal constraint and/or objective model comprises automatically generated constraint and/or objective definitions that are syntactically different from the human-generated constraint and/or objective definitions and syntactically correct for a specific optimization engine.

An exemplary computer program product may comprise program instructions executable by the processor to cause the processor to generate a formal objective model from the labeled data, wherein the formal objective model comprises an automatically generated objective function that is syntactically different from the human-generated objective function and syntactically correct for a specific optimization engine. In an exemplary embodiment, generating the labeled data may comprise selecting values for each one of a plurality of decision variables. Generating the labeled data may also comprise inputting the values to an objective function to compute a value of the objective function, and inputting the values to the human-generated constraint and/or objective definitions to determine, for each value, whether the value satisfies its corresponding constraints and/or objectives. The labeled data may comprise, for each solution, real values of each decision variable input to an objective function of the optimization problem, and a Boolean value for each solution indicating whether the values of the plurality of decision variables satisfy corresponding human-generated constraint definitions.

BRIEF DESCRIPTION OF THE SEVERAL VIEWS OF THE DRAWINGS

FIG. 3A is an example of constraints and/or objectives being programmed using a general purpose programming language; and FIG. 3B is an example of a formal constraint that has been learned from constraint data.

DETAILED DESCRIPTION

Figure 1:
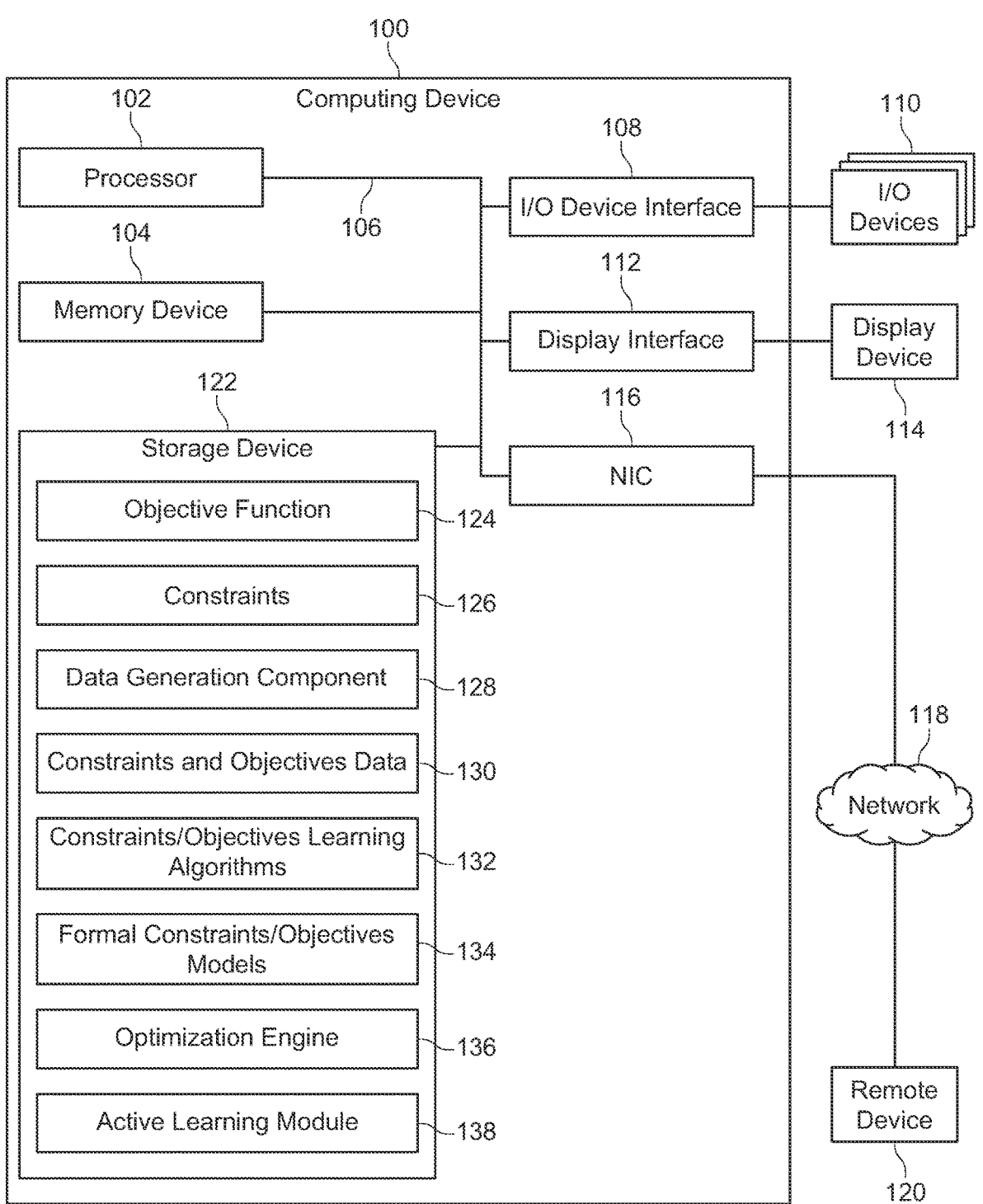
FIG. 1 depicts an example computing device that is configured to generate constraints and objectives for an optimization problem according to an embodiment described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure describes techniques for learning constraints and objectives for an optimization problem from a programmatic specification in any programming language. A typical optimization problem involves finding an optimal or near-optimal solution for a problem that involves several variables, each of which is subject to various constraints that determine whether a particular solution to the problem is valid. Accordingly, solving an optimization problem involves understanding the business problem and translating it into a set of objectives and constraints that can be solved by a mathematical optimization solver such as IBM's CPLEX®.

"Black box" solvers allow coding the constraints and objectives in a widely used general-purpose programming language. This encoding is accessible to people with software development skills, and therefore can be used by a much larger number of people then tools targeted at optimization experts. Such code can be written so as to validate whether a solution to the optimization problem meets a constraint and is relatively straightforward to code. However, black box solvers, which are solvers that do not rely on an underlying mathematical representation of the optimization problem, are typically much less efficient than solvers which can utilize such a mathematical model. Therefore, the optimization solutions provided by such systems often do not yield significant value, without significant tweaking and adaptation of the underlying black box algorithm, which once again requires significant time and expertise due to the required understanding of the underlying algorithms.

Another technique for generating constraints and/or objectives is to learn the these from available data using, for example, a machine learning algorithm. Such techniques involve starting with a labeled dataset, and then automatically learning the constraints and/or objectives from the data. This enables learning a formal model of the constraints and/or objectives that is expressed in a format specific to mathematical optimization and constraint programming solvers, which can solve the underlying optimization problems much more efficiently. The shortcomings of this approach are that often the data available in practice does not embody all of the features required to truly learn the constraints and/or objectives, and do not take into account all possible decisions, and, therefore, the constraints and/or objectives learned from such data could be highly inaccurate.

The present disclosure describes a technique for learning a formal model of an optimization model that includes constraints and objectives defined over a set of decision variables, which specify the possible decisions that can be made. In accordance with embodiments, constraints and objectives are coded in a general programming language that can be used to validate the constraints. The coded constraint specifications are then used in conjunction with a data generation procedure to generate a high quality labeled data set. This data set can then be used to learn a formal mathematical model of the constraints and objectives that is formatted in a precise manner that is tailored for the specific optimization engine to be used. In other words, the techniques described herein provide a way of converting the originally defined constraints in any programming language into a format that is capable of being processed by mathematical optimization engines. This formal representation of the constraints can typically be solved by optimization engines much more efficiently, and/or with a better outcome, as compared to black box solvers. Additionally, the present techniques may also be coupled with active learning wherein the programmatic specification can be used to provide feedback on whether specific generated data examples violate the constraints, and/or the objective value of such examples.

With reference now to FIG. 1, an example computing device is depicted that is configured to programmatically define constraints for an optimization problem. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to a storage device 122 that stores files, data, and programming code for implementation of the disclosed techniques. The storage device can include an objective function 124, constraints 126, a data generation component 128, constraints and/or objectives data 130, constraints and/or objectives learning algorithms 132, formal constraints and/or objectives models 134, and an optimization engine 136, and an active learning module 138. In describing the present techniques, the term "constraints and/or objectives" is used to illustrate that the present techniques include cases in which only some of the constraints or objectives are learned in this way. Moreover, a single constraint or objective may be learned from programmatic specification, as well as cases in which the entire model is learned in this way. Both objectives and constraints are specified using a set of decision variables. The decision variables could be specified as inputs.

The objective function(s) 124 may be specified by a developer codifying the domain knowledge of the business user and can include several decision variables. The objective function(s) is/are specified as a function in any suitable programming language based on the business objects defined, and must return a real number as a result. The goal of the optimization process is to determine a solution that optimizes the value of the objective function(s) (e.g., maximizes or minimizes the value of each such function). The computed value of an objective function may be referred to herein as the cost or reward depending on whether the value is to be minimized or maximized. The solution is the set of values input to the variables of the objective function. Those of ordinary skill in the art will appreciate that the present techniques may be applied to multi-objective problems, in which a single problem may have multiple objective functions.

The decision variables are subject to a set of constraints 126. The constraints 126 are programmatically defined constraints that have been generated by a human such as a developer according to the specification of domain knowledge provided by the business user. The constraints may be specified as a Boolean function in any suitable programmatic language. In general, code may be written for each constraint, so that for any solution of the optimization problem, it returns true if the constraint is satisfied and false otherwise.

The data generation component 128 the constraints 126 and the objectives are used to generate the optimization model learning data 128. To generate this data 128, possible solutions to the optimization problem are generated. Each possible solution includes a selected value for the each of the decision variables. The selected values for each solution may be generated randomly and may include values that are both feasible and infeasible (i.e., do or do not satisfy the constraints 126). The solution is also provided as input to each constraint 126, and each constraint returns a Boolean value (i.e., true or false) for each variable indicating whether the value of the variable satisfies the constraint. The solution is also provided to each objective function to get the objective value on this solution. The result is a set of labeled constraints and objectives data 130 that includes, for each solution, the solution variables, the resulting cost or reward, and an indication for each solution variable regarding whether its value satisfies the applicable constraint.

The constraint and/or objectives learning algorithms 132 generate a formal constraints and objectives model 134 using the labeled constraints and objectives data 130. The algorithm for learning the formal constraint model may be any suitable machine learning algorithm, including QUACQ (Quick Acquisition System), Valiant's Algorithm, and others. The formal constraint model describes the constraints that have been learned from the constraints and objectives data 130 and are formatted in way that is tailored to a specific optimization engine. The algorithm for learning the formal objective model may be any suitable machine learning algorithm, including linear regression algorithms, Support Vector Machines (SVMs), deep neural networks, and others. As with the formal constraint model, the formal objective model describes the objective function that had been learned from the constraints and objectives data 130 and is formatted in way that is tailored to a specific optimization engine.

In some embodiments, the active learning module 138 may be configured to select additional input data to be input to the data generation component 128. The active learning module 138 can select the input data in terms of values to all or some of the decision variables, based on the results of previous iterations of the constraints and/or objectives learning algorithms 132.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the data generation component 128, constraints and/or objectives learning algorithms 132, optimization engine 136, and active learning module 138 are partially, or entirely, implemented in hardware and/or in the processor 102. For example, the functionality may be implemented with an application specific integrated circuit, logic implemented in an embedded controller, or in logic implemented in the processor 102, among others. The term logic, as referred to herein, can include any suitable hardware (e.g., a processor, among others), software (e.g., an application, among others), firmware, or any suitable combination of hardware, software, and firmware.

Figure 2:
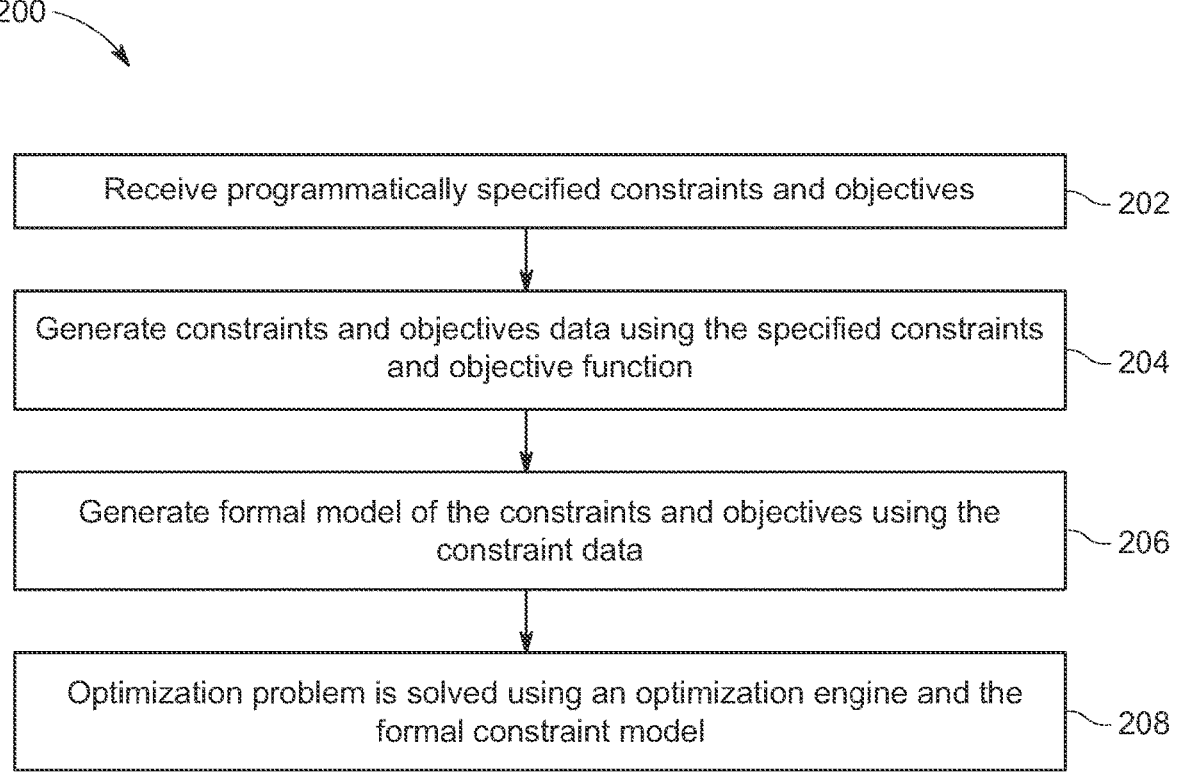
FIG. 2 is a process flow diagram of an example method of learning optimization constraints and/or objectives according to an embodiment described herein.

FIG. 2 is a process flow diagram of an example method of learning optimization constraints. The method 200 can be implemented with any suitable computing device, such as the computing device 100 of FIG. 1. The method may begin at block 202.

At block 202, programmatically specified constraints and objectives are received. The constraints may be specified using any general programming language such as C, C+, C++, Python, Java, and others. As used herein, the term "general programming language" refers to any general purpose programming language that is not specifically designed for use with a specific optimization engine. Accordingly, the constraints received at block 202 are not syntactically correct for the optimization engine and not able to be used as input to the optimization engine. The constraints may be specified as a Boolean expression, returning "true" if the constraint is satisfied and "false" if the constraint is not satisfied. Each constraint describes limitations on or more decision variables that have been defined by a user with domain knowledge of the particular business problem. Similarly an objective function is a function that receives as input parts of a solution and returns a real number specifying the quality of the solution, or the value of the objective on the solution which should be maximized or minimized. The specific set of values for each of the variables of the objective and constraint functions may be referred to as a solution.

At block 204, optimization learning data is generated using a data generation component. To generate the constraint data, the data generation component can select values to assign to each of the solution variables. This data is input into the programmatic specification to compute the cost or reward for the solution and compute the value of each of the constraints and/or objectives specifications defined at block 204 to determine whether the variable values satisfy the respective constraints. The resulting data is a set of labeled data that includes the solution (i.e., the variable values), the computed cost or reward (i.e., the computed value of each objective function), and a Boolean value for each constraint indicating whether the respective constraint is satisfied based on the values of the solution variables.

Any suitable method may be used to select the variable values for each processed solution. In some embodiments, the variable values may be selected randomly. For example, the data generation component can select values by sampling over a specified range of possible values in increments specified by the user. In some embodiments, rather than selecting solution variables randomly, an active learning module may be used to select the solution variables. For example, the active learning module can generate a sample solution, input the solution to the programmatic specification and generate a single instance of labeled constraint data. The active learning module may be programmed to select the next solution based on the data, constraints and objectives obtained from the previous iteration or iterations. In this way, the resulting learning data may represent a more useful exploration of the solution space. For example, more solutions may be provided at areas of interest such as between true/false boundaries. In some embodiments, some labeled data may be provided by human labelers and added to the automatically generated constraint data.

At block 206, a formal model of the constraints and objectives is generated using the data generated at block 204. The formal model of the constraints and objectives can be generated automatically using a machine learning algorithm that are trained using the labeled constraint data. The formal model of the constraints and objectives is a model in which the constraints and objectives are expressed in a specific format that is syntactically correct and can be interpreted by the optimization engine. The specific format will depend on the optimization engine being used. Examples of optimization formats that can be used include OPL (Optimization Programming Language) and AMPL (A Mathematical Programming Language). It should also be noted that the automatically generated constraint and objectives definitions generated at block 206 will be syntactically and substantively different from the programmatic definitions received at block 202.

At block 208, the optimization problem is solved using an optimization engine and the formal constraint model generated at block 206. Any suitable optimization engine may be used. The optimization engine generates a solution that maximizes a reward or minimizes a cost. As mentioned above in relation to FIG. 1, the solution can cause one or more computer readable instructions to be executed by a processor.

The process flow diagram of FIG. 2 is not intended to indicate that the operations of the method 200 are to be executed in any particular order, or that all of the operations of the method 200 are to be included in every case. Additionally, the method 200 can include additional operations not shown or described.

FIG. 3A is an example of a constraint that is programmed using a general purpose programming language. FIG. 3A also shows an objective function 302 that is programmed using a general-purpose programming language. In this example, the programming language is Python, however other programming languages can be used. In this example, the objective function describes the total cost of office space based on employee office assignments, where each office is associated with an office type and a floor number. The optimal solution to this problem is an assignment of offices that minimizes the total cost.

The example constraint 304 describes a limitation that relates to the office assignments, namely that each employee must be assigned to the same floor as the employee's team lead, unless the team lead is identified as "independent." A user may provide a specification for the constraint 304. The result of the constraint 304 when the solution variables are entered is a value of true or false indicating whether the constraint is satisfied. As describe above, the objective function 302 and constraint 304 may be used to generate constraint and objective data, and this data may be used to learn a formal model of the constraints and objectives, which is shown in FIG. 3B.

FIG. 3B is an example of a formal constraint of the type that can be understood by an optimization engine and therefore could be learned from constraint data. The objective function 306 shown on FIG. 3B is the objective function of the type that would be input to the optimization engine. The objective function 306 may be learned from the labeled constraint data. As with the objective function 302, the objective function 306 describes the total cost of office space based on employee office assignments, and the goal is to find a solution minimizes the total cost of the office space. In this example, the objective function also includes an area penalty that imposes additional cost based on the total area of all of the office spaces combined.

The constraint 308 specifies that each employee must be assigned to the same floor as the employee's team lead, unless the team lead is identified as "independent." Accordingly, the constraint 308 is substantively the same as the constraint 306 in that it imposes the same limitation on the employee assignment variable. However, the constraint 308 is in the syntactically correct format that can be processed by the optimization engine.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for learning all or part of a mathematical optimization model, comprising:
 a memory device to store human-specified constraint and/or objective definitions that have been programmed in a general-purpose programming language by a human user, wherein the human-specified constraint is human-generated, the human-specified constraint and/or objective definitions are not designed for use with a specific optimization engine; and
 a processor to:
  select the specific optimization engine to generate a solution to an optimization problem;
  generate labeled data for a plurality of solutions to the optimization problem using the human-generated constraint and/or objective definitions, wherein the processor in generating the labeled data is further configured to:
   select values for each one of a plurality of decision variables;
   input the values to an objective function to compute a value of the objective function; and
   input the values to the human-generated constraint definitions to determine, for each solution, whether the values satisfy a corresponding constraints;
  generate a formal constraint and/or objective model from the labeled data, wherein the formal constraint and/or objective model comprises automatically generated constraint and/or objective definitions that are syntactically different from the human-generated constraint and/or objective definitions and syntactically correct for the specific optimization engine; and
  generate a formal objective model from the labeled data, wherein the formal objective model comprises an automatically generated objective function that is syntactically different from a human-generated objective function and syntactically correct for the specific optimization engine.

2. The system of claim 1, wherein the processor is further configured to generate a solution to the optimization problem using the automatically generated constraint and/or objective definitions, and execute a computer-readable instruction based on the solution.

3. The system of claim 1, wherein to select values of each one of the plurality of decision variables comprises to select the values, via an active learning algorithm, based on the labeled data generated for a previously processed solution or previous learning iterations.

4. The system of claim 1, wherein the labeled data comprises, for each solution:
 real values of each decision variable input to an objective function of the optimization problem; and
 a Boolean value for each solution indicating whether the values of the plurality of decision variables satisfy corresponding human-generated constraint definitions.

5. The system of claim 4, wherein the labeled data further comprises a value of the objective function(s) computed based on the input values of each solution.

6. The system of claim 1, wherein the automatically generated constraint/objective definitions are generated by a machine learning algorithm.

7. A method of learning all or part of a mathematical optimization model, comprising:
 receiving human-generated constraint and/or objective definitions that have been programmed in a general-purpose programming language by a human user, wherein the human-specified constraint and/or objective definitions are not designed for use with a specific optimization engine;
 selecting the specific optimization engine to generate a solution to an optimization problem;
 generating labeled data for a plurality of solutions to the optimization problem using the human generated constraint and/or objective definitions, wherein the generating the labeled data further comprises:
  selecting values for each one of a plurality of decision variables;
  inputting the values to an objective function to compute a value of the objective function; and
  inputting the values to the human-generated constraint definitions to determine, for each solution, whether the values satisfy a corresponding constraints;
 generating a formal constraint and/or objective model from the labeled data, wherein the formal constraint and/or objective model comprises automatically generated constraint and/or objective definitions that are syntactically different from the human-generated constraint and/or objective definitions and syntactically correct for the specific optimization engine; and
 generating a formal objective model from the labeled data, wherein the formal objective model comprises an automatically generated objective function that is syntactically different from a human-generated objective function and syntactically correct for a specific optimization engine.

8. The method of claim 7, comprising generating a solution to the optimization problem using the automatically generated constraint and/or objective definitions, and executing a computer-readable instruction based on the solution.

9. The method of claim 7, wherein to select values of each one of the plurality of decision variables comprises to select the values, via an active learning algorithm, based on the labeled data generated for a previously processed solution or previous learning iterations.

10. The method of claim 7, wherein the labeled data comprises, for each solution:

real values of each solution variable input to an objective function of the optimization problem; and a Boolean value for each solution indicating whether the values of the plurality of decision variables satisfy corresponding human-generated constraint definitions.

11. The method of claim 10, wherein the labeled data further comprises a value of the objective function(s) computed based on the input values of each solution variable.

12. The method of claim 7, wherein the automatically generated constraint/objective definitions are generated by a machine learning algorithm.

13. A computer program product comprising a computer readable storage medium having program instructions embodied therewith, wherein the computer readable storage medium is not a transitory signal per se, and wherein the program instructions are executable by a processor to cause the processor to:

receive human-generated constraint and/or objective definitions that have been programmed in a general-purpose programming language by a human userthe human-specified constraint and/or objective definitions are not designed for use with a specific optimization engine;

select the specific optimization engine to generate a solution to an optimization problem;

generate labeled data for a plurality of solutions to the optimization problem using the human generated constraint and/or objective definitions, wherein the generating the labeled data is further configured to cause the processor to:

select values for each one of a plurality of decision variables;

input the values to an objective function to compute a value of the objective function; and input the values to the human-generated constraint definitions to determine, for each solution, whether the values satisfy a corresponding constraints;

generate a formal constraint and/or objective model from the labeled data, wherein the formal constraint and/or objective model comprises automatically generated constraint and/or objective definitions that are syntactically different from the human-generated constraint and/or objective definitions and syntactically correct for the specific optimization engine; and generate a formal objective model from the labeled data, wherein the formal objective model comprises an automatically generated objective function that is syntactically different from a human-generated objective function and syntactically correct for a specific optimization engine.

14. The computer program product of claim 13, wherein the labeled data comprises, for each solution:

real values of each decision variable input to an objective function of the optimization problem; and a Boolean value for each solution indicating whether the values of the plurality of decision variables satisfy corresponding human-generated constraint definitions.

* * * * *